United States Patent Office 3,706,710
Patented Dec. 19, 1972

3,706,710
PROCESS FOR PREPARING DISCOLORATION-RESISTANT CURABLE POLYURETHANE COATINGS
Louis T. Camilleri, North Bellmore, and Anthony F. Forgione, Bayshore, N.Y., assignors to Hooker Chemical Corporation, Niagara Falls, N.Y.
No Drawing. Filed Dec. 31, 1970, Ser. No. 103,279
Int. Cl. C08g 53/00, 22/18
U.S. Cl. 260—75 NE
17 Claims

ABSTRACT OF THE DISCLOSURE

Moisture curable polyurethane coatings are rendered discoloration-resistant by first reacting a polyol with an aromatic polyisocyanate and completing the reaction with an aliphatic polyisocyanate.

BACKGROUND OF THE INVENTION

Polyurethane coating compositions based on aromatic diisocyanates exhibit severe discoloration or yellowing upon aging, particularly in the presence of ultraviolet light. It has now been found possible to prepare discoloration-resistant polyurethanes by the sequential addition of an aromatic polyisocyanate and an aliphatic polyisocyanate. Reacting the polyol with a mixture of an aromatic polyisocyanate and an aliphatic polyisocyanate is not as effective in producing discoloration resistant polyurethane coating compositions.

In addition to the foregoing advantages, the present invention provides a method for modifying other physical properties such as mechanical strength including toughness and chemical resistance including solvent resistance and hydrolytic stability.

It is therefore the object of this invention to provide new moisture curable polyurethane coating compositions. It is also the object of this invention to provide new moisture curable polyurethane coating compositions based on polyesters, polyethers and polyesteramides. A further object of this invention is to provide moisture curable polyurethane compositions which are resistant to discoloration or yellowing upon aging. A still further object of the invention is to provide a process whereby the new moisture curable polyurethane compositions which are resistant to discoloration can be prepared. These and other objects will become apparent to those skilled in the art from the following detailed description.

SUMMARY OF THE INVENTION

This invention relates to discoloration resistant moisture curable polyurethane coating compositions. More particularly, the invention relates to discoloration resistant moisture curable polyol based polyurethane coating compositions which are prepared by first reacting the polyol with an aromatic polyisocyanate and completing the reaction with an aliphatic polyisocyanate.

DESCRIPTION OF THE PREFERRED EMBODIMENTS

In accordance with this invention, there is provided a polyurethane coating composition produced by reacting excess organic polyisocyanate with a polyol composition which contains functional groups which are reactive with the polyisocyanate. Generally, the reaction of the organic polyisocyanate and polyol composition is carried out in the presence of a suitable solvent which also serves as a liquid medium or diluent for the polyurethane coating composition. The resulting products are readily curable, particularly when catalyzed, by atmospheric moisture to provide the cured polyurethane coating. Alternatively, the products can be partially cured by reaction with suitable polyols prior to moisture curing.

The polyol composition containing functional groups reactive with polyisocyanate can include hydroxyl containing polyesters, hydroxyl containing polyethers, polymerized lactones, amide containing polyesters and the like. Any suitable hydroxyl containing polyester can be used such as, for example, the reaction product of a carboxylic acid and a polyhydric alcohol. Suitable carboxylic compounds can be either an acid, acid anhydride, acid halide, or mixtures thereof, and can be aliphatic, cycloaliphatic, aromatic or heterocyclic, and further can be either saturated or unsaturated. Among the compounds which can be employed are the respective acids, anhydrides and halides of adipic, succinic, glutaric, azelaic, sebacic, malonic, maleic, fumaric, phthalic, isophthalic, terephthalic, tetrachlorophthalic, chlorendic, and the like.

The alcohols employed in the hydroxyl containing polyester can, in general, comprise any polyhydric alcohol. Typical examples include ethylene glycol; diethylene glycol; triethylene glycol; tetraethylene glycol; propylene glycol; dipropylene glycol; polypropylene glycol; hexalene glycol; 2-methyl-2-ethyl-1,3-propane diol; 2-ethyl-1,3-hexane diol; 1,5-pentane diol; thiodiglycol; 1,3-propane diol; 1,3-butane diol; 2,3-butane diol; 1,4-butane diol; neopentyl glycol; 1,2-dimethyl-1,2-cyclopentane diol; 1,2-cyclohexane diol; 1,2-dimethyl-1,2-cyclohexane diol; glycerol; trimethylol propane; trimethylol ethane; 1,2,4-butane triol; 1,2,6-hexane triol; pentaerythritol; dipentaerythritol; tripentaerythritol; anhydroaneaheptitol; mannitol; sorbitol; methylglucoside; like compounds apparent to those skilled in the art; and mixtures thereof. Generally, the polyhydric alcohols have two to six hydroxyl groups.

The polyol composition can also be a polyester amide which is produced by the reaction of an amine and/or amine alcohol with a polycarboxylic compound, such as those described hereinbefore. Typical amines include ethylene diamine, diethylene diamine, hexamethylene tetraamine, propylene diamine, dipropylene diamine, and the like. Suitable amine alcohols include methanol amine, ethanol amine, propanol amine, and the like. Further, a mixture of a glycol and an amino alcohol or polyamine can be employed. Any of the glycols described hereinbefore are suitable.

The polyol can be a polyether, such as the reaction product of a 1,2-epoxide and a polyhydric alcohol or a polycarboxylic compound. Suitable polyhydric alcohols and polycarboxylic compounds are those disclosed hereinbefore. Suitable epoxides are ethylene oxide, propylene oxide, butylene oxide, cyclohexane oxide, styrene oxide, allyl glycidyl ether, glycidyl methyl sulfone, and the like. Preferred are the alkylene oxides of 2 to 6 carbon atoms.

The polyol can be a polymerized lactone, such as reaction product of a lactone with a polyfunctional alcohol, a polyfunctional amine or an aminoalcohol. Suitable alcohols and aminoalcohols are those disclosed hereinbefore. Suitable amines include hexamethylenediamine, benzidine, diethylenetriamine, and the like. Suitable lactones include epsilon-caprolactone, epsilon-methyl-epsilon-caprolactone, gamma-methyl-epsilon-caprolactone, gamma-octyl-epsilon-caprolactone, beta, delta - dimethyl-epsilon-caprolactone, delta-valerolactone, and the like.

The polyol composition can be dissolved in a solvent that provides a suitable carrier for the finished polyurethane coating composition. Suitable solvents include the alkanes, such as hexane, octane, and the like; aromatic hydrocarbons such as toluene, and xylene; esters of a carboxylic compound and an alcohol, such as ethyl acetate, butyl acetate, ethyl propionate, ethyl butyrate, and the like; ketones such as aliphatic ketones having one to eight carbon atoms per aliphatic group, for example, acetone, methyl ethyl ketone, dibutyl ketone, methylhexyl ketone and the like; chlorinated hydrocarbons such as trichloroethylene, perchloroethylene and the like; and the like solvents. Generally the solvent is employed in a proportion to provide about 10 to 80 weight percent solids or non-volatiles as determined by ASTM D–1644–59 (Method A). More usually, the range is about 25 to about 75 weight percent solids.

To improve the storage stability of the final polyurethane coating compositions, essentially anhydrous raw materials are used or the solution of polyol composition is preferably dehydrated to reduce the water content thereof to a value of less than about 100 parts of water per million of solution. More preferably, the water content is reduced to a value in the range of about 10 to about 75 parts of water per million. The dehydration step is conveniently achieved by subjecting the solution to an azeotropic distillation. Such distillation is generally carried out at a temperature in the range of 70 to 200° C. and atmospheric pressure. However, higher and lower pressures such as up to 30 pounds per square inch absolute can be used and the temperature will vary accordingly. Preferably, the distillation conditions are 70 to 160° C. and at atmospheric pressure. Other dehydration methods are useful including subjecting the solution to chemical dehydrating agents such as molecular sieves, zeolites, and the like.

In addition to the solvent method just disclosed the polyol component can be prepared as a prepolymer in the absence of solvent, and the prepolymer can be subsequently diluted with solvent. When the prepolymer viscosity is sufficiently low, no solvent may be necessary, and the system can be treated as a one hundred percent solid, liquid castable system.

The polyol solution is sequentially reacted with an aromatic polyisocyanate and with an aliphatic polyisocyanate. The aromatic polyisocyanate can be 2,4-toluene diisocyanate, 2,6-toluene diisocyanate, and mixtures of the two isomers especially mixtures of 80% of the 2,4-isomer and 20% of 2,6-isomer. Additional examples include 4,4'-diphenyl methane diisocyanate, p-phenylene diisocyanate, 2,4,6-tolylene triisocyanate and 4,4',4"-triphenylmethane triisocyanate. Crude mixtures which are commercially available are also useful. Typical aliphatic polyisocyanates includes hexamethylene diisocyanate, 4,4'-methylene bis-(cyclohexylisocyanate), meta-xylylene diisocyanate, isophorone diisocyanate, 2,2,4- and 2,4,4-trimethyl hexamethylene diisocyanate, 1,3-cyclopentalene diisocyanate, dimer acid diisocyanate, and the like. Crude commercial mixtures of such aliphatic polyisocyanates are also useful.

The organic polyisocyanates and polyol components of the polyurethane composition are reacted in a suitable portion to provide an excess of isocyanato groups based on the total number of hydroxyl or other equivalent groups, i.e., polycarboxylic, amide, amine and the like. Generally the components are employed in a proportion to provide at least about 1.5 isocyanato groups per hydroxyl or equivalent groups. Preferably, the ratio is in the range of about 1.7 to about 2.5 isocyanato groups per hydroxyl or equivalent group. Generally, the organic polyisocyanate is added to the polyol solution, but the polyol solution can also be added to a body of the organic polyisocyanate. The reaction is conducted at moderate temperatures in the range of about 25 to about 120° C. and preferably, the temperature is in the range of 40 to about 80° C.

The aromatic polyisocyanate and aliphatic polyisocyanate are employed in a proportion such that the aliphatic polyisocyanate is about 60 to about 80 mole percent of the total isocyanate employed. Thus, if the polyisocyanates are employed to provide 1.5 isocyanato groups per hydroxyl or equivalent groups, the aromatic diisocyanate will provide about 0.3 to about 0.5 isocyanato groups per hydroxyl or equivalent group and the aliphatic isocyanate will provide about 1 to about 1.2 isocyanato groups per hydroxyl or equivalent group.

The polyurethane coating compositions of the invention can be applied to various substrates such as metal, i.e., steel, aluminum, copper, brass, and the like, wood, ceramics, glass, and to polymer compositions. The coating compositions can be cured merely by exposure to atmospheric moisture. Alternatively, the moisture curing coating compositions can be partially cured with the aid of a suitable polyol, such as a dihydric alcohol, e.g., ethylene glycol, polypropylene glycol, butane diol, dipropylene glycol, other polypropylene glycols, polybutalene glycols, and the like. Other polyols known in the art can also be employed.

Suitable catalysts for assisting the curing of the polyurethane compositions include the known conventional catalysts for isocyanate reactions, but the tertiary amines are preferred. Many such compounds are useful in the reaction, but they generally have up to 20 carbon atoms. Typical compounds of the trialkyl amines, such as trimethyl amine, triethyl amine, tetramethyl butane diamine and the like. Also suitable are the morpholine compounds such as N-methyl morpholine, N-acetyl morpholine, 4,4'-dithiomorpholine, and the like, and the tertiary amine compounds have other functional groups such as diethyl ethanol amine, methyl diethanol amine, N-diethyl aminoacetic acid, methyl aminodipropionic acid, N-methyl dipropylene triamine, dimethyl piperazine, and the like. The preferred amine compounds are triethyl amine and tetramethyl guanidine. Other urethane catalysts are also useful, for example: the antimony compounds, such as antimony caprylate, antimony naphthenate, and antimonous chloride; the tin compounds such as dibutylin dilaurate, tri-n-octyltin oxide, hexabutylditin, tributyltin phosphate or stannic chloride.

The following examples serve to further illustrate the invention but are not intended to limit it. Unless indicated otherwise throughout this specification and claims, all parts are by weight and temperatures are in degrees centigrade. The following system was used to rate the color of the coatings tested

| Rating: | Description |
| --- | --- |
| 0 | Excellent—no discoloration. |
| 1 | Very Good—very little yellowing. |
| 2 | Good—some yellowing. |
| 3 | Fair—noticeable yellowing. |
| 4 | Poor—excessive yellowing. |
| 5 | Very poor—severe discoloration. |

EXAMPLE 1

A moisture curable polyurethane composition according to the invention was prepared by dissolving 300 grams of a linear, hydroxyl terminated polyester in 124 grams of methyl ethyl ketone and 124 grams of xylol. The polyester was derived from the esterification of 1,6-hexanediol with a mixture of adipic and isophthalic acids in a mole ratio of 7:3 to have an average molecular weight of 1500. A charge of 8.7 grams of toluene diisocyanate was added to the polyester solution, the solution was heated to 60–70 degrees centigrade and maintained at that temperature for one hour. The solution was then cooled to 55 degrees centigrade and a charge of 43.1 grams of 4,4'-methylene bis (cyclohexyl isocyanate) was added. The temperature was increased to 65–75 degrees centigrade and maintained for three hours. The temperature was then allowed to cool to 30 degrees centigrade and 1.2 grams of dibutyltin dilaurate (catalyst) was added.

The moisture curable polyurethane coating composition was tested for 72 hours in a Fadeometer and received a rating of 1.

EXAMPLE 2

Example 1 was repeated except that toluene diisocyanate was the only organic polyisocyanate employed. The Fadeometer rating of the resulting moisture curable composition was 5.

EXAMPLE 3

Example 1 was repeated except that 4,4'-methylene bis (cyclohexyl isocyanate) was the only organic polyisocyanate employed. The resulting moisture curable composition received a Fadeometer rating of 0.

EXAMPLE 4

A mixture of the polyurethane compositions of Examples 2 and 3 was made in a proportion to provide the same level of toluene diisocyanate and 4,4'-methylene bis (cyclohexyl isocyanate) as employed in Example 1. The weight ratios were 1.68 parts of the composition of Example 2 to 8.32 parts of the composition of Example 3. The resulting composition received a Fadeometer rating of 3.

EXAMPLE 5

Example 1 was repeated except that the order of addition of the organic polyisocyanates was reversed. The resulting composition received a Fadeometer rating of 4.

EXAMPLE 6

Example 1 was repeated except that hexamethylene diisocyanate was employed in place of the 4,4'-methylene bis (cyclohexyl isocyanate). The resulting composition received a 72 hour Fadeometer rating of 1.

EXAMPLE 7

Example 1 was repeated except that metaxylylene diisocyanate was employed in place of the 4,4'-methylene bis (cyclohexyl isocyanate). The resulting composition reecived a 72 hour Fadeometer rating of 1.

EXAMPLE 8

Example 1 was repeated except that isophorone diisocyanate was employed in place of the 4,4'-methylene bis (cyclohexyl isocyanate). The resulting composition exhibited a 72 hour Fadeometer rating of 1.

EXAMPLE 9

Example 1 was repeated except that a mixture of 2,2,4- and 2,4,4-trimethyl hexamethylene diisocyanate was employed in place of the 4,4'-methylene bis (cyclohexyl isocyanate). The resulting composition exhibited a 72 hour Fadeometer rating of 1.

EXAMPLE 10

The polyurethane composition of Example 1 is used to saturate fabric webbing material. The composite is subjected to atmospheric moisture and cured in the production of industrial slings.

EXAMPLE 11

The polyurethane compositions of Examples 1, 6, and 7 were spread on a steel plate, subjected to atmospheric moisture and cured to form a thin coating.

Various changes and modifications can be made in the process and products of this invention without departing from the spirit and the scope of the invention. The various embodiments of this invention disclosed herein serve to further illustrate the invention but are not to limit it.

We claim:

1. A process for producing moisture curable discoloration resistant polyurethanes which comprises sequentially reacting a polyol composition containing functional groups reactive with isocyanato groups with an aromatic polyisocyanate in a first reaction and thereafter with an aliphatic polyisocyanate in a proportion to provide at least about 1.5 isocyanato groups for each isocyanato reactive group in the polyol composition said aromatic polyisocyanate and said aliphatic polyisocyanate being employed in a proportion such that the aliphatic polyisocyanate is about 60 to about 80 mole percent of the total isocyanate employed.

2. The process of claim 1 wherein the polyol composition is dissolved in a solvent prior to reaction with the organic polyisocyanates.

3. The process of claim 2 wherein the aromatic polyisocyanate is toluene diisocyanate.

4. The process of claim 2 wherein the aliphatic polyisocyanate is 4,4'-methylene bis(cyclohexyl isocyanate).

5. The process of claim 1 wherein the aliphatic polyisocyanate is a hexamethylene diisocyanate.

6. The process of claim 1 wherein the aliphatic polyisocyanate is meta-xylylene diisocyanate.

7. The process of claim 1 wherein the aliphatic polyisocyanate is isophoron diisocyanate.

8. The process of claim 1 wherein the aliphatic polyisocyanate is a mixture of 2,2,4-trimethyl hexamethylene diisocyanate and 2,4,4-trimethyl hexamethylene diisocyanate.

9. The moisture curable polyurethane product of claim 1.

10. The moisture curable polyurethane product of claim 4.

11. The moisture curable polyurethane product of claim 5.

12. The moisture curable polyurethane product of claim 6.

13. The moisture curable polyurethane product of claim 7.

14. The moisture curable polyurethane product of claim 8.

15. A coating composition comprising the polyurethane product of claim 9 and a solvent.

16. A coating composition comprising the polyurethane product of claim 9 when cured with atmospheric moisture.

17. An article comprising the cured polyurethane product of claim 9 adherently bonded to a substrate.

References Cited

UNITED STATES PATENTS

| | | | |
|---|---|---|---|
| 2,837,498 | 6/1958 | Ferstandig | 260—75 |
| 2,929,800 | 3/1960 | Hill | 260—77.5 |
| 3,218,348 | 11/1965 | McElroy et al. | 260—471 |
| 3,350,362 | 10/1967 | Potts et al. | 260—77.5 |
| 3,352,830 | 11/1967 | Schmitt et al. | 260—77.5 |
| 3,436,361 | 4/1969 | Wooster | 260—18 |
| 3,441,588 | 4/1969 | Wagner et al. | 260—453 |
| 3,454,505 | 7/1969 | Cross et al. | 260—2.5 |
| 3,523,106 | 8/1970 | Davison | 260—77.5 |
| 3,554,962 | 1/1971 | Fischer | 260—45.8 |

DONALD E. CZAJA, Primary Examiner

H. S. COCKERAM, Assistant Examiner

U.S. Cl. X.R.

260—31.2, 32.8, 33.6, 33.8, 75 NC, 75 NT